United States Patent
Kashiwamura

(10) Patent No.: US 11,458,964 B2
(45) Date of Patent: Oct. 4, 2022

(54) DRIVER ASSISTANCE DEVICE, DRIVER ASSISTANCE METHOD, AND DRIVER ASSISTANCE SYSTEM

(71) Applicant: Hitachi Automotive Systems, Ltd., Hitachinaka (JP)

(72) Inventor: Satoshi Kashiwamura, Atsugi (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 16/960,959

(22) PCT Filed: Dec. 21, 2018

(86) PCT No.: PCT/JP2018/047347
§ 371 (c)(1),
(2) Date: Jul. 9, 2020

(87) PCT Pub. No.: WO2019/138851
PCT Pub. Date: Jul. 18, 2019

(65) Prior Publication Data
US 2020/0369267 A1    Nov. 26, 2020

(30) Foreign Application Priority Data
Jan. 10, 2018  (JP) .............................. JP2018-001950

(51) Int. Cl.
*B60W 30/095* (2012.01)
*B60W 60/00* (2020.01)
(Continued)

(52) U.S. Cl.
CPC ........ *B60W 30/095* (2013.01); *B60W 40/068* (2013.01); *B60W 40/072* (2013.01);
(Continued)

(58) Field of Classification Search
CPC .......... B60W 30/095; B60W 60/0051; B60W 40/068; B60W 40/072; B60W 2555/00; B60W 2510/20; B60W 2520/00
See application file for complete search history.

(56) References Cited

U.S. PATENT DOCUMENTS

| 5,483,453 A | 1/1996 | Uemura et al. |
| 2009/0037053 A1* | 2/2009 | Yamazaki ............. B60W 10/16 701/41 |

(Continued)

FOREIGN PATENT DOCUMENTS

| EP | 2 434 467 A1 | 3/2012 |
| JP | 6-4799 A | 1/1994 |

(Continued)

OTHER PUBLICATIONS

Japanese-language Office Action issued in Japanese Application No. 2019-564610 dated Feb. 16, 2021 with partial English translation (11 pages).

(Continued)

*Primary Examiner* — Hunter B Lonsberry
*Assistant Examiner* — Jay Khandpur
(74) *Attorney, Agent, or Firm* — Crowell & Moring LLP

(57) ABSTRACT

A driver assistance device, a driver assistance method, and a driver assistance system according to the present invention make it possible to: determine a distribution of a risk of a vehicle departing from a drivable width of a road on which the vehicle travels based on driving environment factors including a road curvature and a friction coefficient of a road surface of a curve approaching the vehicle; calculate an operation variable of an actuator related to a steering operation of the vehicle based on the distribution of the risk; and output the operation variable to the actuator. This enables steering control based on potential risk evaluation made by (Continued)

taking into account a risk that the controllability of the vehicle may decrease when the vehicle travels on a curve.

12 Claims, 10 Drawing Sheets

(51) Int. Cl.
*B60W 40/068* (2012.01)
*B60W 40/072* (2012.01)

(52) U.S. Cl.
CPC ..... *B60W 60/0051* (2020.02); *B60W 2510/20* (2013.01); *B60W 2520/00* (2013.01); *B60W 2555/00* (2020.02)

(56) References Cited

U.S. PATENT DOCUMENTS

| | | | |
|---|---|---|---|
| 2011/0015850 A1* | 1/2011 | Tange | B60T 8/17557 |
| | | | 701/116 |
| 2012/0072097 A1 | 3/2012 | Ohta et al. | |
| 2013/0030602 A1* | 1/2013 | Joeng | B60W 30/12 |
| | | | 701/1 |
| 2013/0179382 A1* | 7/2013 | Fritsch | B60W 30/095 |
| | | | 706/46 |
| 2019/0084561 A1* | 3/2019 | Takeda | G08G 1/167 |

FOREIGN PATENT DOCUMENTS

| | | | |
|---|---|---|---|
| JP | H1199956 A | * | 4/1999 |
| JP | 2001-48035 A | | 2/2001 |
| JP | 2005306200 A | * | 11/2005 |
| JP | 2006-154967 A | | 6/2006 |
| JP | 2017-128277 A | | 7/2017 |
| KR | 20110062440 A | * | 6/2011 |
| KR | 20150061781 A | * | 6/2015 |
| WO | WO 2010/134396 A1 | | 11/2010 |
| WO | WO-2017061230 A1 * | 4/2017 ............ G06T 11/60 |

OTHER PUBLICATIONS

International Preliminary Report on Patentability (PCT/IB/326, PCT/IB/338, & PCT/IB/373) issued in PCT Application No. PCT/JP2018/047347 dated Jul. 23, 2020, including English translation of document C2 (Japanese-language Written Opinion (PCT/ISA/237) previously filed on Jul. 9, 2020 (11 pages).
Extended European Search Report issued in European Application No. 18899924.7 dated Feb. 8, 2021 (7 pages).
International Search Report (PCT/ISA/210) issued in PCT Application No. PCT/JP2018/047347 dated Mar. 26, 2019 with English translation (three (3) pages).
Japanese-language Written Opinion (PCT/ISA/237) issued in PCT Application No. PCT/JP2018/047347 dated Mar. 26, 2019 (six (6) pages).

* cited by examiner

DRIVER ASSISTANCE DEVICE, DRIVER ASSISTANCE METHOD, AND DRIVER ASSISTANCE SYSTEM

TECHNICAL FIELD

The present invention relates to a driver assistance device, to a driver assistance method, and to a driver assistance system, and more particularly, relates to steering control of a vehicle traveling on a curve.

BACKGROUND ART

Patent Document 1 discloses a minimum-risk trajectory generation device configured to measure a road shape and detect an obstacle, and to calculate a minimum-risk trajectory based on these.

The minimum-risk trajectory generation device includes a means for determining a risk level at each point on a road based on a detected obstacle position and a road shape measurement; a means for estimating a travel path of a host vehicle based on a driving condition of the host vehicle; and a means for calculating a minimum-risk trajectory that minimizes the sum of the risk levels at the points along the estimated travel path.

REFERENCE DOCUMENT LIST

Patent Document

Patent Document 1: JP 2006-154967 A

SUMMARY OF THE INVENTION

Problem to be Solved by the Invention

The minimum-risk trajectory generation device disclosed in Patent Document 1 is configured to generate a minimum-risk trajectory based on the assumption that the host vehicle can reliably trace a course having the minimum risk. However, the host vehicle travelling on a curve is at a potential risk that largely depends not only on obstacles around the host vehicle but also on the driving environment of the host vehicle.

For example, in a driving environment in which the host vehicle travels on a curve having a greater curvature and/or a road surface with a smaller friction coefficient, the host vehicle is more likely to fail to trace the target course.

It is thus preferable to evaluate a risk for the host vehicle traveling on a curve by taking into account not only a risk of accidental contact with an obstacle around the host vehicle but also a risk that the controllability of the host vehicle may decrease in a curve.

The present invention has been made in view of such conventional circumstances, and an object of the present invention is to provide a driver assistance device, a driver assistance method, and a driver assistance system, each of which enables steering control of a vehicle based on potential risk evaluation made by taking into account a risk that the controllability of the vehicle may decrease when the vehicle travels on a curve.

Means for Solving the Problem

According to an aspect of the present invention, risk distribution-related information regarding a departure risk distribution is determined based on driving environment-related information regarding a driving environment of a curve approaching a vehicle. Here, the departure risk distribution is a distribution of a risk of a vehicle departing from a drivable width of a road on which the vehicle travels, and the driving environment-related information is acquired by an external environment recognition unit. Then, actuator operation variable-related information regarding an operation variable of an actuator related to a steering operation of the vehicle is determined based on the risk distribution-related information, and the actuator operation variable-related information is output to the actuator.

Effects of the Invention

According to the present invention, it is possible to ensure safety of a host vehicle by performing steering control by taking into account the risk that the controllability of the host vehicle may decrease when the host vehicle travels on a curve.

MODE FOR CARRYING OUT THE INVENTION

Hereinafter, a driver assistance device, a driver assistance method, and a driver assistance system according to an embodiment of the present invention will be described with reference to the drawings.

Figure 1:
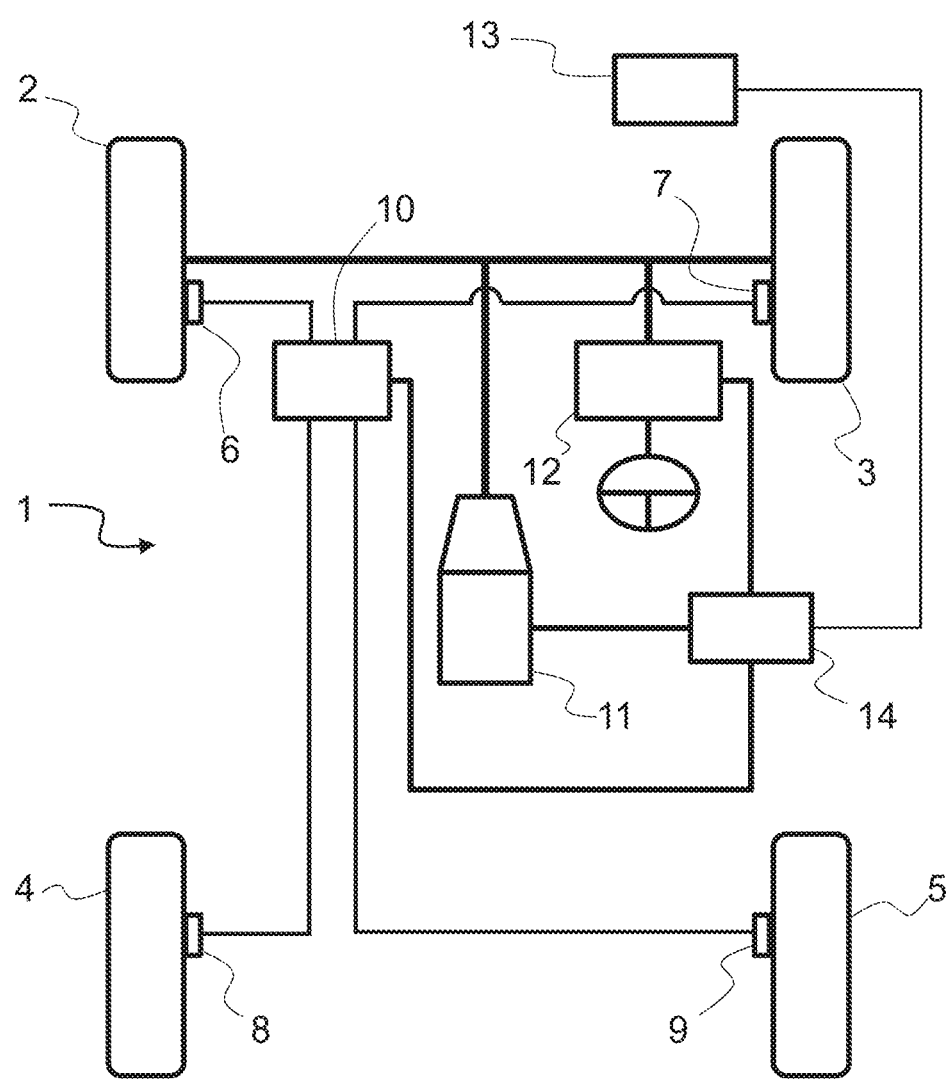
FIG. 1 is a block diagram of an implementation of a hardware configuration of a driver assistance system.

FIG. 1 is a block diagram of an implementation of a hardware configuration of a driver assistance system according to an embodiment of the present invention.

An implementation of a vehicle to which the technique according to this embodiment is applied includes, for example: a device configured to read information on a road ahead of the vehicle by using a camera and/or a global positioning system (GPS) together with map information; a steering device with an autonomous steering capability; and an anti-skid device configured to gather information for estimating a speed and driving conditions of the vehicle, a friction coefficient µ of a road surface on which the vehicle travels, and the like.

A vehicle 1 is a four-wheeled vehicle having a left front wheel 2, a right front wheel 3, a left rear wheel 4, and a right rear wheel 5. Wheels 2-5 are provided respectively with wheel cylinders 6-9 which constitute a brake system.

The hydraulic pressures of wheel cylinders 6-9 are adjusted by a wheel cylinder hydraulic pressure control device 10. A typical example of wheel cylinder hydraulic pressure control device 10 is an anti-skid device.

An engine 11 is an internal combustion engine configured such that torque output by engine 11 is electronically controlled, and may include an electronically controlled throttle.

A steering device 12, which has an automatic steering capability, includes a steering-related actuator. A typical example of steering device 12 is an electric power steering device which includes a motor for generating a steering assist force.

An external environment recognition control unit 13, which serves as an external environment recognition unit, is configured to process map information and/or image information obtained by a camera, and output the resultant information as external environment information, i.e., as driving environment-related information.

A driver assistance control unit 14, which serves as a driver assistance device, includes a microcomputer and is configured to be able to communicate with other control units through an on-vehicle network. Driver assistance control unit 14 is configured to receive the external environment information from external environment recognition control unit 13 and output command signals for instructing a steering operation, an engine output, a brake operation, and the like.

Driver assistance control unit 14 may include multiple independent units.

Figure 2:
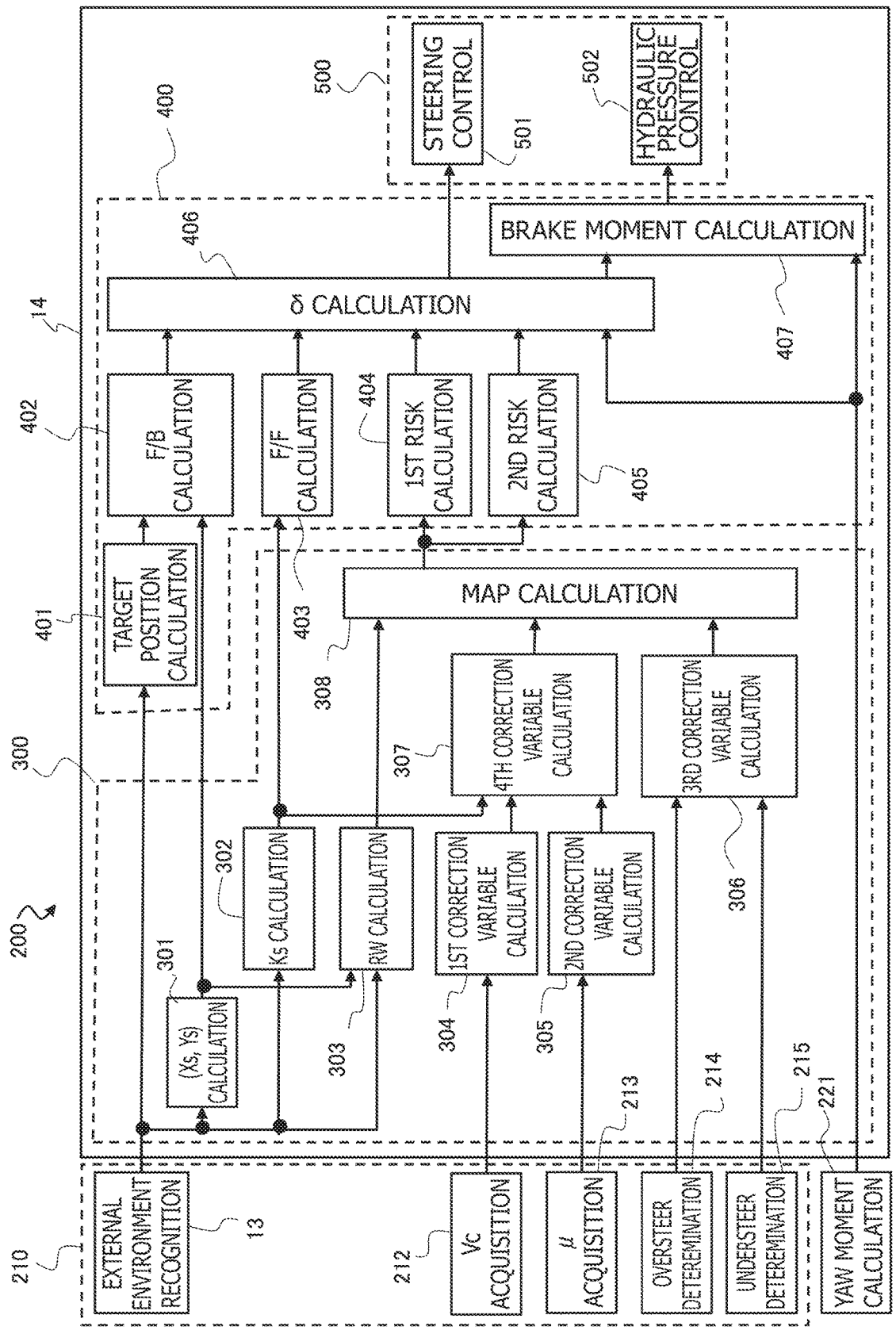
FIG. 2 is a functional block diagram of a driver assistance system.

FIG. 2 is a block diagram of an implementation of the configuration of a driver assistance system 200 that includes driver assistance control unit 14.

Driver assistance control unit 14 is configured to receive driving condition-related information acquired by an information acquisition unit 210 that includes external environment recognition control unit 13, and to output operation variable-related information to steering device 12. The driving condition-related information includes external environment information, a vehicle speed, a friction coefficient of a road surface, and one or more behavioral stability indices of vehicle 1.

Driver assistance control unit 14 includes a departure risk calculation unit 300, an actuator operation variable calculation unit 400, an actuator operation output unit 500, and the like. Departure risk calculation unit 300 has a function of determining risk distribution-related information based on the driving condition-related information acquired by information acquisition unit 210. The risk distribution-related information is regarding the distribution of the risk that the vehicle may depart from the drivable width of a road at a preview point. Actuator operation variable calculation unit 400 has a function of determining the operation variable-related information for steering device 12 based on the risk distribution-related information. Actuator operation output unit 500 has a function of outputting the operation variable-related information to steering device 12.

In addition to external environment recognition control unit 13 described above, information acquisition unit 210 also includes a vehicle speed acquisition unit 212, a road surface friction coefficient acquisition unit 213, an oversteer determination unit 214, and an understeer determination unit 215. Vehicle speed acquisition unit 212 is configured to acquire information on the speed of vehicle 1 (host vehicle).

Road surface friction coefficient acquisition unit 213, which serves as a second external environment recognition unit, is configured to acquire information on a friction coefficient of a road surface with which the wheels of vehicle 1 are in contact. Such friction coefficient-related information at least partially constitutes the driving environment-related information on the driving environment ahead of vehicle 1. Oversteer determination unit 214 is configured to acquire oversteer-related information, which at least partially constitutes behavioral state-related information on vehicle 1. Understeer determination unit 215 is configured to acquire understeer-related information, which at least partially constitutes the behavioral state-related information on vehicle 1.

Each of vehicle speed acquisition unit 212, oversteer determination unit 214, and understeer determination unit 215 described above serves as a vehicle behavior sensing unit (in other words, behavior sensor) configured to acquire behavioral state-related information on a vehicle. The behavioral state-related information on a vehicle includes the speed of the vehicle as well as understeer-related information and oversteer-related information on the vehicle.

A yaw moment calculation unit 221 is configured to calculate a yaw moment required to prevent sideslip of vehicle 1 and thereby stabilize the behavior of vehicle 1.

Next, a functional aspect of departure risk calculation unit 300 will be described.

A preview point calculation unit 301 is configured to calculate a preview point based on the external environment information acquired by external environment recognition control unit 13. A curvature calculation unit 302 is configured to calculate the road curvature at the preview point calculated by preview point calculation unit 301, based on the external environment information acquired by external environment recognition control unit 13. A drivable width calculation unit 303 is configured to calculate a drivable width at the preview point calculated by preview point calculation unit 301, based on the external environment information acquired by external environment recognition control unit 13.

As used herein, "drivable width" indicates the width of a road area within which a vehicle can travel and which is defined considering the lane width (i.e., edges) of the road, obstacles, and the like.

A first correction variable calculation unit 304 is configured to calculate a first correction variable for correcting a risk map based on the vehicle speed acquired by vehicle speed acquisition unit 212. The risk map will be described later. A second correction variable calculation unit 305 is configured to calculate a second correction variable for correcting the risk map based on the friction coefficient of a road surface acquired by road surface friction coefficient acquisition unit 213.

A third correction variable calculation unit 306 is configured to calculate a third correction variable for correcting the risk map based on determination results of oversteer determination unit 214 and understeer determination unit 215.

A fourth correction variable calculation unit 307 is configured to calculate a fourth correction variable for correcting the risk map based on the road curvature calculated by curvature calculation unit 302, the first correction variable calculated based on the vehicle speed by first correction variable calculation unit 304, and the second correction variable calculated based on the friction coefficient of the road surface by second correction variable calculation unit 305.

A risk map calculation unit 308 is configured to calculate a risk map based on the drivable width at the preview point calculated by drivable width calculation unit 303, the fourth correction variable calculated by fourth correction variable calculation unit 307 by taking into account the vehicle speed, the friction coefficient of the road surface, and the road curvature, and the third correction variable calculated by third correction variable calculation unit 306 by taking into account the understeer/oversteer behavior of vehicle 1. The risk map corresponds to the risk distribution-related information regarding the distribution of the risk that vehicle 1 may depart from the drivable width at the preview point.

In other words, risk map calculation unit 308 is configured to take in account driving environment factors including the road curvature and the friction coefficient of a road surface as well as driving conditions including the vehicle speed and vehicle behaviors that include an understeer/oversteer tendency of vehicle 1, in calculating the distribution of the risk that vehicle 1 may depart from the drivable width at a preview point.

Figure 3:
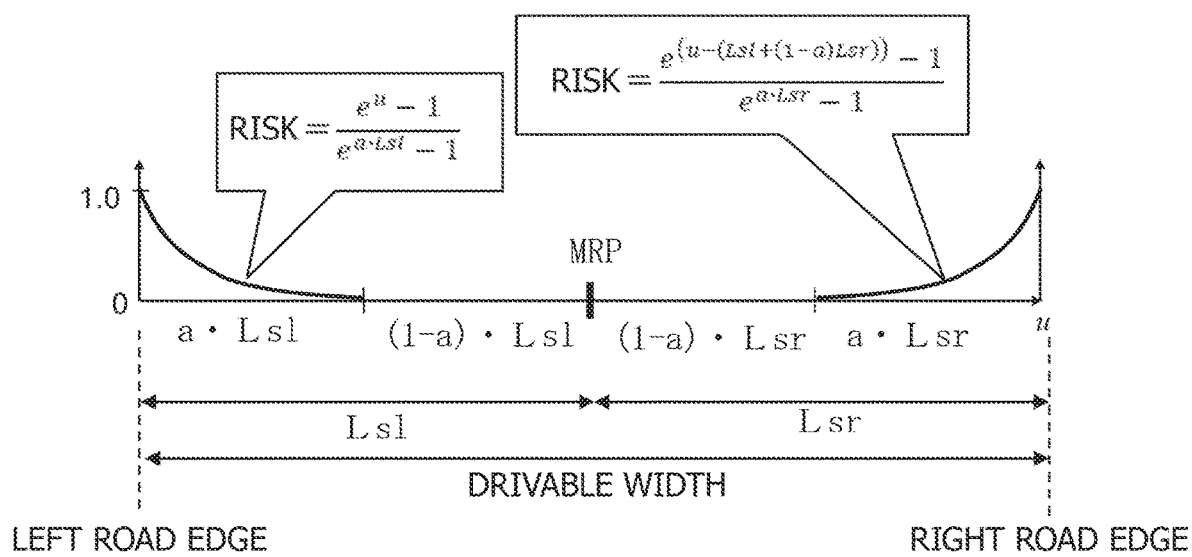
FIG. 3 is a diagram for illustrating general characteristics of a risk map.

The distribution of such a departure risk according to the present invention is given with reference to a position that ensures the minimum departure risk within the drivable width such that the departure risk increases as the distance in the road width direction from the reference position increases, as shown in FIG. 3. Risk map calculation unit 308 shifts the reference position in the road width direction based on current driving conditions such as the driving environment and vehicle behaviors, thereby generating a risk map suitable for the driving conditions.

Next, a functional aspect of actuator operation variable calculation unit 400 will be described.

A target vehicle position calculation unit 401 is configured to calculate a target vehicle position based on the external environment information. An FB operation variable calculation unit 402 is configured to calculate a feedback operation variable to be output to steering device 12, based on the target vehicle position calculated by target vehicle position calculation unit 401 and the preview point calculated by preview point calculation unit 301.

An F/F operation variable calculation unit 403 is configured to calculate a feedforward operation variable to be output to steering device 12, based on the road curvature at the preview point calculated by curvature calculation unit 302.

A first departure risk calculation unit 404 is configured to calculate the risk that vehicle 1 may depart from a road across the left road edge (i.e., may depart from the drivable width across the left end thereof), based on the risk map calculated by risk map calculation unit 308. A second departure risk calculation unit 405 is configured to calculate the risk that vehicle 1 may depart from a road across the right road edge (i.e., may depart from the drivable width across the right end thereof), based on the risk map calculated by risk map calculation unit 308.

A target steering variable calculation unit 406 is configured to calculate a target steering variable for steering device 12, based on the feedback operation variable, the feedforward operation variable, the departure risk calculated based on the risk map, and the yaw moment for stabilizing the vehicle behavior.

When a high departure risk is calculated based on the risk map, target steering variable calculation unit 406 corrects the target steering variable in a direction to reduce or prevent the lane departure, thereby ensuring safety of vehicle 1.

A target brake moment calculation unit 407 is configured to calculate a target brake moment for compensating for the shortage of the lateral force produced by the steering operation based on the target steering variable.

The target steering variable calculated by target steering variable calculation unit 406 is output to a steering variable control unit 501. Steering variable control unit 501 is configured to output information related to the operation variable corresponding to the target steering variable to steering device 12, thereby controlling the steering operation of steering device 12.

The target brake moment calculated by target brake moment calculation unit 407 is output to a hydraulic pressure control unit 502. Hydraulic pressure control unit 502 is configured to control the hydraulic pressures to be supplied to wheel cylinders 6-9, that is, the braking forces to be applied to wheels 2-5, in accordance with the target braking moment.

Note that the brake device of vehicle 1 is not limited to a hydraulic brake. For example, an electric brake, which is directly driven by a motor, may be alternatively used to implement brake control according to the target brake moment.

Next, the functions of departure risk calculation unit 300 will be described in more detail.

First, preview point calculation unit 301 calculates a preview point (Xs, Ys) based on the road information acquired by external environment recognition control unit 13. The preview point (Xs, Ys) indicates a position at a predetermined distance ahead of vehicle 1.

Then, curvature calculation unit 302 calculates the road curvature Ks at the preview point (Xs, Ys) based on the road conditions acquired by external environment recognition control unit 13.

As used herein, a negative value of the road curvature Ks indicates a left-hand road curvature, and a positive value of the road curvature Ks indicates a right-hand road curvature.

Based on the road information acquired by external environment recognition control unit 13, drivable width calculation unit 303 calculates a drivable width RW at the preview point (Xs, Ys).

The drivable width RW indicates the width of a road area within which vehicle 1 can travel and which is determined based on the detected road edges (i.e., detected obstacles).

Next, a general procedure in which risk map calculation unit 308 generates a risk map will be described.

When vehicle 1 has no particular driving risk, risk map calculation unit 308 generates a risk map so that an area sufficiently far from obstacles (in other words, road edges) around vehicle 1 has the minimum risk, in the following manner.

First, risk map calculation unit 308 calculates the distance Lsl from the left end of the drivable width RW to a minimum risk point MRP at which the departure risk is minimum, and the distance Lsr from the right end of the drivable width RW to the minimum risk point MRP, using Expressions 1 below.

$$Lsl = \frac{RW}{2}$$

$$Lsr = RW - Lsl$$

(Expressions 1)

The distances Lsl, Lsr calculated using Expressions 1 satisfy Lsl=Lsr. This means that, when vehicle 1 has no particular driving risk, risk map calculation unit 308 locates the minimum risk point MRP at the center of the drivable width RW.

Next, risk map calculation unit 308 generates a risk distribution (see FIG. 3) such that the departure risk increases exponentially with a decrease in the distance to the left or right road edge from the minimum risk point MRP that is located based on the distances Lsl, Lsr.

Specifically, risk map calculation unit 308 calculates departure risk values in the risk map, which are normalized to have the maximum value of 1.0, as a function of the distance u by separating the road into the four areas shown in FIG. 3 as follows, where u is the distance from the left edge (used as a reference road edge herein) of the road (0≤u≤RW), and a is the parameter for defining how much of the road is covered by an area within which the risk increases exponentially (0<a<1.0).

For the area defined by 0≤u≤a·Lsl, that is, the area having the width of a·Lsl and proximal to the left edge of the road, risk map calculation unit 308 calculates the departure risk according to Expression 2 of the exponential function.

$$\text{Risk} = \frac{e^u - 1}{e^{a \cdot Lsl} - 1} \quad \text{(Expression 2)}$$

For the area defined by a·Lsl<u<Lsl, that is, the area having the width of (1−a)·Lsl and lying proximal to the minimum risk point MRP and within the area from the left edge of the road to the minimum risk point MRP, risk map calculation unit 308 sets the departure risk to zero.

Similarly, for the area defined by Lsl<u≤Lsl+(1−a)·Lsr, that is, the area having the width of (1−a)·Lsr and lying proximal to the minimum risk point MRP and within the area from the minimum risk point MRP to the right edge of the road, risk map calculation unit 308 sets the departure risk to zero.

For the area defined by Lsl+(1−a)·Lsr<u≤RW, that is, the area having the width of a·Lsr and proximal to the right edge of the road, risk map calculation unit 308 calculates the departure risk according to Expression 3 of the exponential function.

$$\text{Risk} = \frac{e^{(u - (Lsl + (1-a)Lsr))} - 1}{e^{a \cdot Lsr} - 1} \quad \text{(Expression 3)}$$

As described above, when vehicle 1 has no particular driving risk, risk map calculation unit 308 sets the distances Lsl, Lsr to be equal to each other, thereby locating the minimum risk point MRP at the center of the drivable width RW. Thus, the departure risk values calculated as a function of the distance u as described above has the distribution as shown in FIG. 3.

Specifically, risk map calculation unit 308 sets the departure risk to zero in the area within the distance of (1−a)·Lsl from the center (i.e., minimum risk point MRP) of the drivable width RW in the direction toward the left edge of the road as well as in the area within the distance of (1−a)·Lsr from the center of the drivable width RW in the direction toward the right edge of the road. In other words, risk map calculation unit 308 sets the departure risk to zero in a certain center section, including the minimum risk point MRP, of the drivable width RW.

On the other hand, risk map calculation unit 308 varies the departure risk in the area separated by the distance of (1−a)·Lsl or more from the center of the drivable width RW in the direction toward the left edge of the road so that the departure risk increases exponentially as the distance from the center of the drivable width RW increases and reaches 1.0 at the left edge of the road.

Similarly, risk map calculation unit 308 varies the departure risk in the area separated by the distance of (1−a)·Lsr or more from the center of the drivable width RW in the direction toward the right edge of the road so that the departure risk increases exponentially as the distance from the center of the drivable width RW increases and reaches 1.0 at the right edge of the road.

As described above, when vehicle 1 has no particular driving risk, the distances Lsl, Lsr are set to be equal to each other. Thus, in this case, the risk map has a symmetric risk distribution with respect to the center of the drivable width RW, as shown in FIG. 3.

Departure risk calculation unit 300 has a function of, when vehicle 1 travels on a curve, modifying this risk map having a risk distribution symmetric in the road width direction as shown in FIG. 3 so that the departure risk at one of the right and left edges of the road is higher than the other, by taking into account the risk that the controllability of vehicle 1 may decrease in a curve.

Hereinafter, processing for modifying the risk map performed by departure risk calculation unit 300 when vehicle 1 travels on a curve will be described.

Departure risk calculation unit 300 has a function of modifying the risk map based on the vehicle speed Vc, the friction coefficient μ of the road surface, and the road curvature Ks when vehicle 1 travels on a curve, and the function will be described below.

When a vehicle travels on a curve, the greater the road curvature Ks, the higher the vehicle speed Vc, and/or the lower the friction coefficient μ of the road surface, the more likely the vehicle will fail to negotiate an approaching curve. Accordingly, the vehicle is likely to follow a path less sharply curved than the approaching curve, and turn more outward (than the intended turn) to depart from the curve. Thus, departure risk calculation unit 300 reflects such tendency in the risk map when vehicle 1 travels on a curve.

First, departure risk calculation unit 300 calculates a first adjustment gain Gvc (1≤Gvc<2) based on the vehicle speed Vc.

Figure 4:
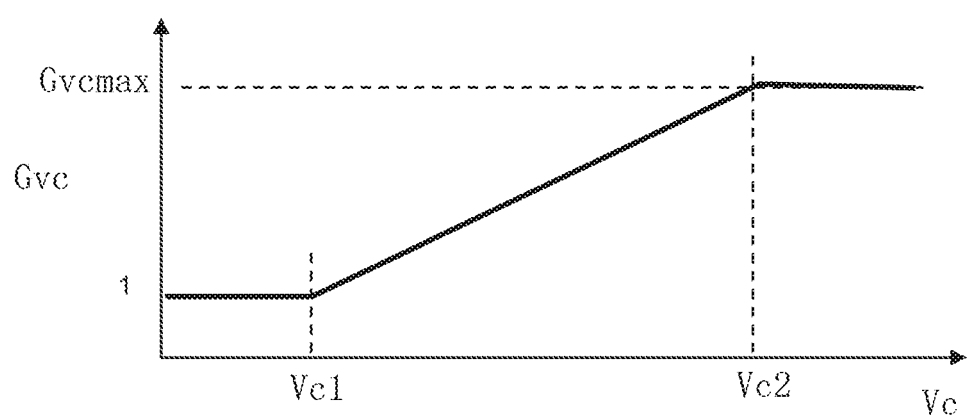
FIG. 4 is a graph of a table for calculating a first adjustment gain Gvc based on a vehicle speed Vc.

The first adjustment gain Gvc is set to a greater value as the vehicle speed Vc is higher. For example, as shown in FIG. 4, the first adjustment gain Gvc is fixed at 1.0 in a range in which the vehicle speed Vc is equal to or less than a first speed threshold Vc1, gradually increases as the vehicle speed Vc increases above the first speed threshold Vc1, and is fixed at a maximum value Gvcmax (1<Gvcmax<2) in a range in which the vehicle speed Vc is equal to or higher than a second speed threshold Vc2 (Vc2>Vc1).

The function of setting the first adjustment gain Gvc based on the vehicle speed Vc corresponds to the function of first correction variable calculation unit 304 in FIG. 2, and the first adjustment gain Gvc corresponds to the first correction variable.

Then, departure risk calculation unit 300 calculates a second adjustment gain Gμ (1≤Gμ<2) based on the friction coefficient μ of the road surface.

Figure 5:
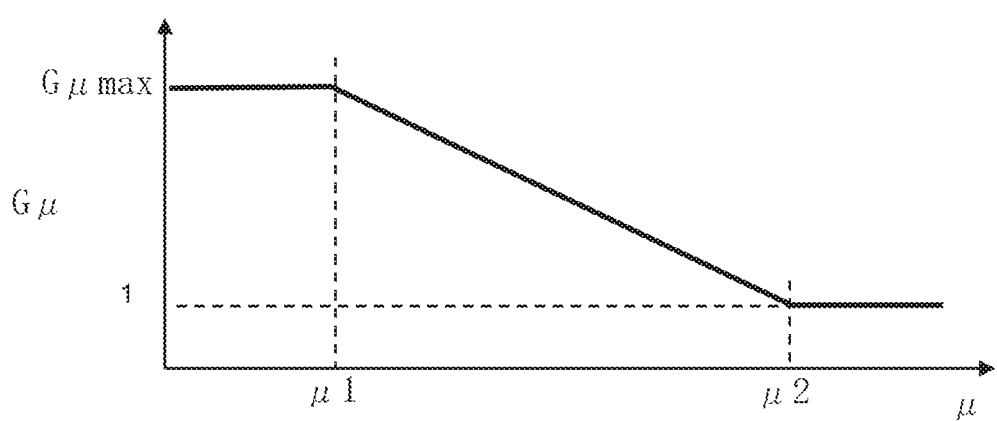
FIG. 5 is a graph of a table for calculating a second adjustment gain Gµ based on a friction coefficient µ.

The second adjustment gain Gμ is set to a greater value as the friction coefficient μ of the road surface is lower; that is, as the road surface is more slippery. For example, as shown in FIG. 5, the second adjustment gain Gμ is fixed at a maximum value Gμmax (1<Gμmax<2) in a range in which the friction coefficient μ is equal to or less than a first friction coefficient threshold μ1, gradually increases as the friction coefficient μ increases above the friction coefficient threshold μ1, and is fixed at 1.0 in a range in which the friction coefficient μ is equal to or higher than a second friction coefficient threshold μ2 (μ2>μ1).

The function of setting the second adjustment gain $G\mu$ based on the friction coefficient $\mu$ of the road surface corresponds to the function of second correction variable calculation unit 305 in FIG. 2, and the second adjustment gain $G\mu$ corresponds to the second correction variable.

Then, departure risk calculation unit 300 performs select-high operation for selecting the greater of the first adjustment gain Gvc calculated based on the vehicle speed Vc and the second adjustment gain $G\mu$ calculated based on the friction coefficient $\mu$ of the road surface, and sets the selected value to a third adjustment gain Gmax (Gmax=max (Gvc, $G\mu$)).

Then, departure risk calculation unit 300 calculates a fourth adjustment gain Gks based on the third adjustment gain Gmax and the road curvature Ks.

Figure 6:
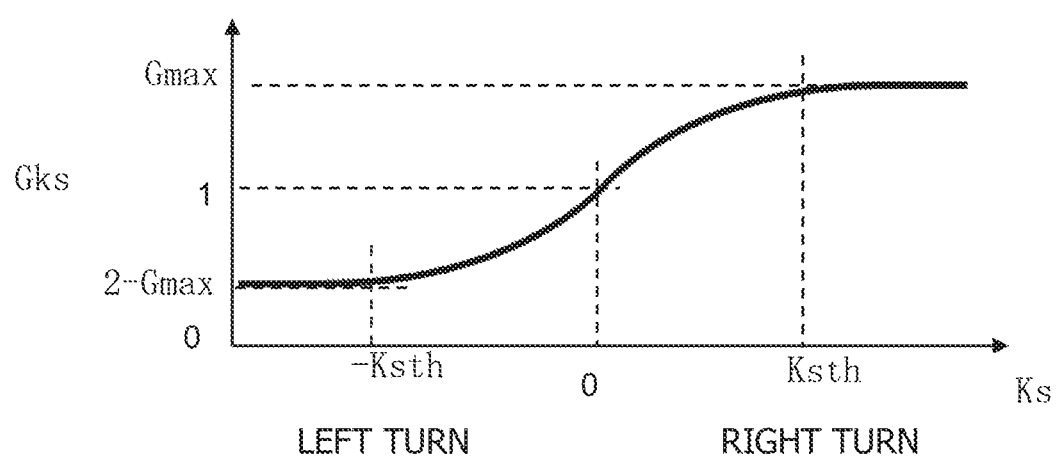
FIG. 6 is a graph of a table for calculating a fourth adjustment gain Gks based on a third adjustment gain Gmax and a road curvature Ks.

The fourth adjustment gain Gks is set with reference to a map established based on the third adjustment gain Gmax as shown in FIG. 6, for example.

As described above, in this embodiment, a negative value of the road curvature Ks indicates a left-hand road curvature, and a positive value of the road curvature Ks indicates a right-hand road curvature. Accordingly, a negative value and a positive value of the road curvature Ks in the map shown in FIG. 6 correspond respectively to a left-hand curve and a right-hand curve. As such, in the map shown in FIG. 6, the fourth adjustment Gks is set to 1.0 when the curvature Ks is zero and indicates a straight road, the fourth adjustment Gks increases above 1.0 as the road curvature Ks increases above 0 (as the right-hand road curvature increases), and the fourth adjustment Gks decreases below 1.0 as the road curvature Ks decreases below 0 (as the left-hand road curvature increases).

Furthermore, in the map shown in FIG. 6, the fourth adjustment gain Gks is set to be equal to the third adjustment gain Gmax in a range in which the road curvature Ks is greater than a curvature threshold Ksth (Ksth>0) (when the right-hand road curvature is greater than a threshold), and the fourth adjustment gain Gks is set to be equal to "2−Gmax" in a range in which the road curvature Ks is less than the curvature threshold Ksth×−1 (when the left-hand road curvature is greater than the threshold).

In other words, the fourth adjustment gain Gks varies within the range between "Gmax" and "2−Gmax" so that the fourth adjustment gain Gks is 1.0 when the road curvature Ks is zero, varies toward the third adjustment gain Gmax as the road curvature Ks shifts to the positive side, and varies toward "2−Gmax" as the road curvature Ks shifts to the negative side.

As described above, the third adjustment gain Gmax is set to the greater of the first adjustment gain Gvc calculated based on the vehicle speed Vc and the second adjustment gain $G\mu$ calculated based on the friction coefficient $\mu$ of the road surface. Accordingly, assuming that the road curvature Ks is the same, the fourth adjustment gain Gks for a right-hand turn is set to a greater value as the vehicle speed Vc is higher and the friction coefficient $\mu$ is smaller. On the other hand, assuming that the road curvature Ks is the same, the fourth adjustment gain Gks for a left turn is set to a smaller value as the vehicle speed Vc is higher and the friction coefficient $\mu$ is smaller.

Then, departure risk calculation unit 300 calculates the distance Lsl from the left edge of the road to the minimum risk point MRP and the distance Lsr from the right edge of the road to the minimum risk point MRP, by applying the thus-calculated fourth adjustment gain Gks to Expressions 4 below.

$$Lsl = RW \cdot \frac{Gks}{2} \quad \text{(Expressions 4)}$$
$$Lsr = RW - Lsl$$

Thus, for example, when vehicle 1 turns right, and thus, the fourth adjustment gain Gks is set to a value greater than 1.0, the risk map is modified as follows. In this case, the minimum risk point MRP is shifted to the right (i.e., toward the inside of the turn) from the center of the drivable width RW, and thus, the distance Lsl from the left edge of the road to the minimum risk point MRP is increased. Accordingly, in this case, based on the distances Lsl, Lsr calculated using Expressions 4, the risk map is modified such that the departure risk on the outside of the turn is greater than on the inside of the turn.

In other words, when vehicle 1 turns right, the risk map is modified such that the departure risk on the outside of the turn is greater than on the inside of the turn by shifting the minimum risk point MRP from the center of the drivable width RW toward the right edge of the road (toward the inside of the turn) by a greater distance as the road curvature Ks is greater, the vehicle speed Vc is higher, and the friction coefficient $\mu$ of the road surface is lower.

On the other hand, when vehicle 1 turns left, and thus, the fourth adjustment gain Gks is set to a value less than 1.0, the risk map is modified as follows. In this case, the minimum risk point MRP is shifted to the left (i.e., toward the inside of the turn) from the center of the drivable width RW, and thus, the distance Lsl from the left edge of the road to the minimum risk point MRP is reduced. Accordingly, in this case, based on the distances Lsl, Lsr calculated using Expressions 4, the risk map is modified such that the departure risk on the outside of the turn is greater than on the inside of the turn.

In other words, when vehicle 1 turns left, the risk map is modified such that the departure risk on the outside of the turn is greater than on the inside of the turn by shifting the minimum risk point MRP from the center of the drivable width RW toward the left edge of the road (toward the inside of the turn) by a greater distance as the road curvature Ks is greater, the vehicle speed Vc is higher, and the friction coefficient $\mu$ of the road surface is lower.

As already described, when a vehicle travels on a curve, as the road curvature Ks is greater, the vehicle speed Vc is higher, and/or as the friction coefficient $\mu$ of the road surface is lower, a sufficient turning force is less likely to be generated in the vehicle and the vehicle is more likely to turn more outward (than the intended turn) and depart from the curve.

In view of this, departure risk calculation unit 300 shifts the minimum risk point MRP from the center of the drivable width RW by a greater distance toward the inside of the turn as the road curvature Ks is greater, the vehicle speed Vc is higher, and/or the friction coefficient $\mu$ of the road surface is lower so that the departure risk on the outside of the turn is set greater than on the inside of the turn.

In other words, when vehicle 1 goes straight, departure risk calculation unit 300 locates the minimum risk point MRP at the center of the drivable width RW and calculates departure risk values such that the departure risk increases toward the left and right road edge lines with respect to the minimum risk point MRP. On the other hand, when vehicle 1 turns a curve, departure risk calculation unit 300 shifts the minimum risk point MRP from the center of the drivable width RW to the left or to the right depending on the driving environment of the curve and calculates departure risk values such that the departure risk increases to the left and right of the drivable width RW with respect to the thus-shifted minimum risk point MRP.

This enables automatic steering for preventing vehicle 1 from travelling along a course with a high potential risk of lane departure, and thus, more reliably ensures safety of vehicle 1 by taking into account the risk that the controllability of vehicle 1 may decrease when vehicle 1 turns.

The function of calculating the third adjustment gain Gmax based on the first adjustment gain Gvc and the second adjustment gain Gμ and calculating the fourth adjustment gain Gks based on the third adjustment gain Gmax and the road curvature Ks corresponds to the function of fourth correction variable calculation unit 307 in FIG. 2, and the fourth adjustment gain Gks corresponds to the fourth correction variable.

Departure risk calculation unit 300 also has a function of correcting the distances Lsl, Lsr that have been calculated based on the fourth adjustment gain Gks, in accordance with the behavioral state of vehicle 1, specifically, whether vehicle 1 has an oversteer tendency and whether vehicle 1 has an understeer tendency.

A vehicle with an oversteer tendency tends to turn more sharply than intended and may turn more inward than the intended turn to depart from the road. Thus, if vehicle 1 has an oversteer tendency and only a turning force less than that required is generated in vehicle 1 when vehicle 1 turns, vehicle 1 is likely to turn more inward than intended and to depart from the course.

Accordingly, it is reasonably effective to downwardly correct the departure risk on the outside of the turn and upwardly correct the departure risk on the inside of the turn when vehicle 1 has an oversteer tendency as compared to when vehicle 1 has no tendency to oversteer, in order to prevent vehicle 1 from turning more inward than intended and departing from the course.

On the other hand, a vehicle with an understeer tendency tends to turn less sharply than intended and may turn more outward than the intended turn to depart from the road. Thus, if vehicle 1 has an understeer tendency and only a turning force less than that required is generated in vehicle 1 when vehicle 1 turns, vehicle 1 is likely to turn more outward than intended and to depart from the course.

Accordingly, it is reasonably effective to downwardly correct the departure risk on the inside of the turn and upwardly correct the departure risk on the outside of the turn when vehicle 1 has an understeer tendency as compared to when vehicle 1 has no tendency to understeer, in order to prevent vehicle 1 from turning more outward than intended and departing from the course.

For this purpose, departure risk calculation unit 300 calculates a correction term Uns for the risk map in accordance with a request for setting a risk associated with an understeer/oversteer tendency, and calculates the distances Lsl, Lsr (minimum risk point MRP) by applying the thus-calculated correction term Uns and the fourth adjustment gain Gks to Expressions 5 below.

$$Lsl = RW \cdot \left(\frac{Gks}{2} + Uns\right)$$
$$Lsr = RW - Lsl$$

(Expressions 5)

It is assumed that, in Expressions 5, the relationship shown in Expression 6 below holds.

$$0 < \left(\frac{Gks}{2} + Uns\right) < 1.0$$

(Expression 6)

Figure 7:
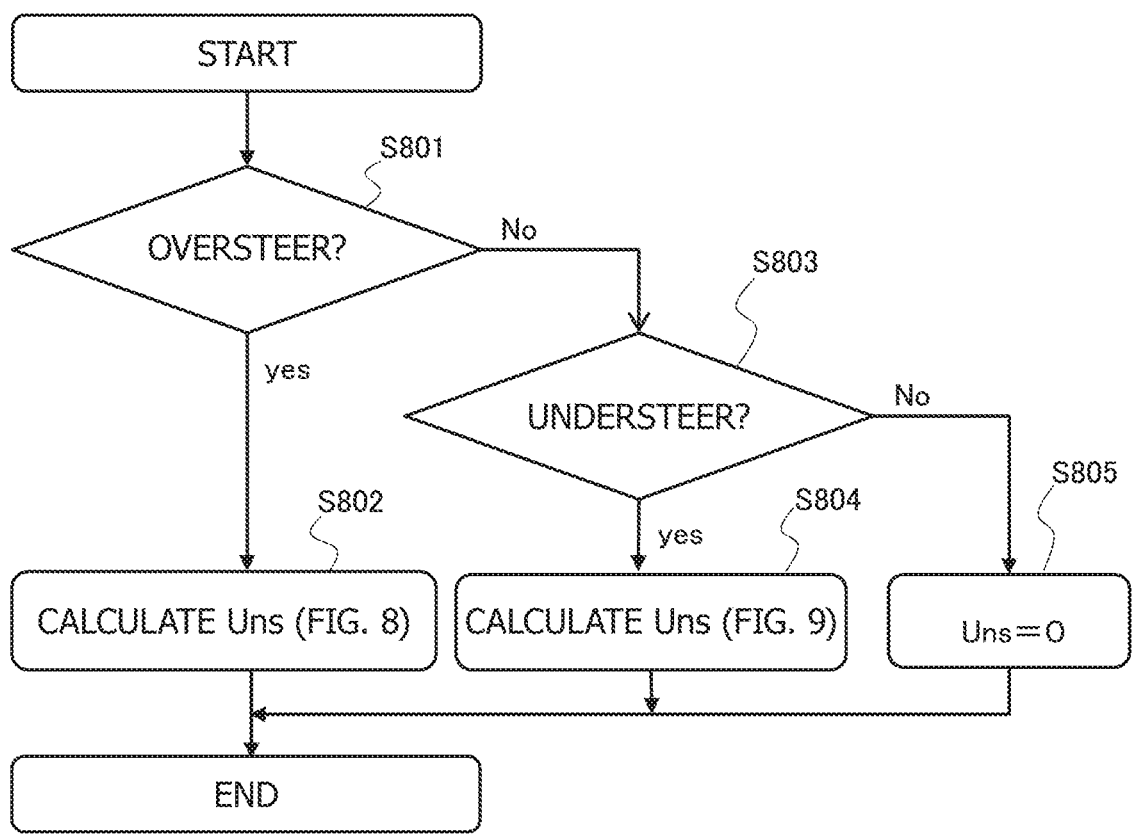
FIG. 7 is a flowchart of a procedure for calculating a correction term Uns according to an understeer/oversteer tendency of a vehicle.

FIG. 7 is a flowchart of a procedure for calculating the correction term Uns performed by departure risk calculation unit 300.

The function of calculating the correction term Uns according to the procedure illustrated in the flowchart of FIG. 7 corresponds to the function of the third correction variable calculation unit 306 in FIG. 2, and the correction term Uns corresponds to the third correction variable.

In step S801, departure risk calculation unit 300 determines whether vehicle 1 has an oversteer tendency based on received oversteer-related information, which at least partially constitutes the behavioral state-related information on vehicle 1.

When departure risk calculation unit 300 determines that vehicle 1 has an oversteer tendency, the operation proceeds to step S802. In step S802, with reference to a map as shown, for example, in FIG. 8, departure risk calculation unit 300 calculates the correction term Uns for correcting the risk map in accordance with the oversteer tendency.

Figure 8:
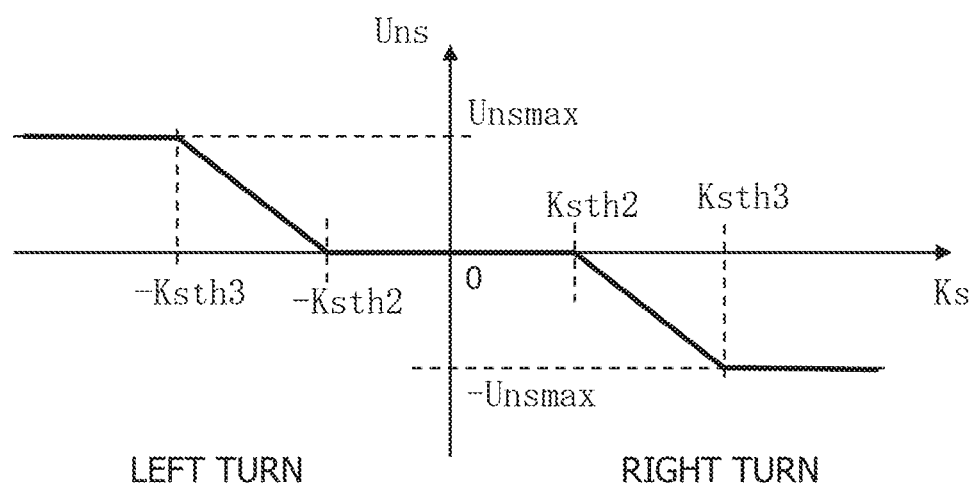
FIG. 8 is a graph of a table for calculating the correction term Uns based on the road curvature Ks when the vehicle has an oversteer tendency.

The map of the correction term Uns in FIG. 8 shows the correlation between the road curvature Ks and the correction term Uns for vehicle 1 with an oversteer tendency. In the map of FIG. 8, the correction term Uns is set to zero in a range in which the absolute value of the road curvature Ks is equal to or less than a threshold Ksth2, and thus, a substantially straight road is assumed. In a range of the road curvature Ks in which a right-hand curve is assumed, the correction term Uns is set to a negative value of which the absolute value increases as the absolute value of the road curvature Ks increases. In a range of the road curvature Ks in which a left-hand curve is assumed, the correction term Uns is set to a positive value of which the absolute value increases as the absolute value of the road curvature Ks increases. However, the absolute value of the correction term Uns is fixed to a constant value |Unsmax| in the ranges in which the absolute value of the road curvature Ks is equal to or greater than a threshold Ksth3.

Assume a case in which vehicle 1 exhibits an oversteer tendency while it turns left, as an example. In this case, departure risk calculation unit 300 sets the correction term Uns to a positive value greater than zero. This increases the distance Lsl and thus, shifts the minimum risk point MRP toward the outside of the turn, as compared to when vehicle 1 exhibits no tendency to oversteer.

As a result, in the risk map based on this minimum risk point MRP, the departure risk on the outside of the turn is corrected downward and the departure risk on the inside of the turn is corrected upward as compared to when vehicle 1 exhibits no tendency to oversteer. Thus, this modified risk map allows preventing vehicle 1 from turning more inward than intended and departing from the course.

When departure risk calculation unit 300 determines that vehicle 1 has no tendency to oversteer in step S801, the operation proceeds to step S803. In step S803, departure risk calculation unit 300 determines whether vehicle 1 has an understeer tendency based on received understeer-related information, which at least partially constitutes the behavioral state-related information on vehicle 1.

When departure risk calculation unit 300 determines that vehicle 1 has an understeer tendency, the operation proceeds to step S804. In step S804, with reference to a map as shown, for example, in FIG. 9, departure risk calculation unit 300 calculates the correction term Uns for correcting the risk map in accordance with the understeer tendency.

Figure 9:
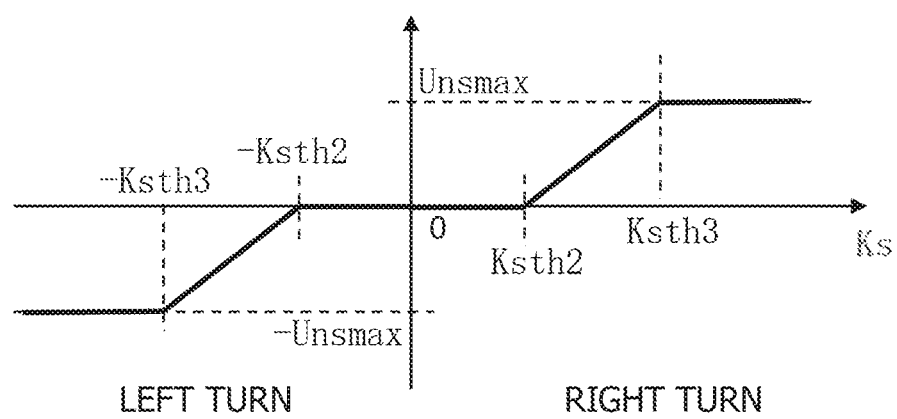
FIG. 9 is a graph of a table for calculating the correction term Uns based on the road curvature Ks when the vehicle has an understeer tendency.

The map of the correction term Uns in FIG. 9 shows the correlation between the road curvature Ks and the correction term Uns for vehicle 1 with an understeer tendency. In the map of FIG. 9, the correction term Uns is set to zero in a range in which the absolute value of the road curvature Ks is equal to or less than the threshold Ksth2 and thus a substantially straight road is assumed. In a range of the road curvature Ks in which a right-hand curve is assumed, the correction term Uns is set to a positive value of which the absolute value increases as the absolute value of the road curvature Ks increases. In a range of the road curvature Ks in which a left-hand curve is assumed, the correction term Uns is set to a negative value of which the absolute value increases as the absolute value of the road curvature Ks increases.

Assume a case in which vehicle 1 exhibits an understeer tendency while it turns left, as an example. In this case, departure risk calculation unit 300 sets the correction term Uns to a negative value less than zero. This reduces the distance Lsl and thus, shifts the minimum risk point MRP toward the inside of the turn, as compared to when vehicle 1 exhibits no tendency to understeer.

As a result, in the risk map based on this minimum risk point MRP, the departure risk on the outside of the turn is corrected upward and the departure risk on the inside of the turn is corrected downward as compared to when vehicle 1 exhibits no tendency to understeer. Thus, this modified risk map allows preventing vehicle 1 from turning more outward than intended and departing from the course.

When departure risk calculation unit 300 determines that vehicle 1 has no tendency to understeer in step S803, the operation proceeds to step S805. In step S805, departure risk calculation unit 300 sets the correction term Uns to zero.

Here, departure risk calculation unit 300 sets the correction term Uns to zero in step S805 since it is not necessary to modify the risk map based on the behavioral state of vehicle 1 when vehicle 1 has no tendency to oversteer or understeer.

In this way, departure risk calculation unit 300 calculates the fourth adjustment gain Gks in accordance with the road curvature Ks, the vehicle speed Vc, and the friction coefficient μ of the road surface, and also calculates the correction term Uns in accordance with the behavioral state of vehicle 1 such as whether vehicle 1 has an oversteer/understeer tendency. Furthermore, departure risk calculation unit 300 calculates the distances Lsl, Lsr by applying the thus-calculated fourth adjustment gain Gks and the correction term Uns to Expressions 5 above.

Then, using the thus-calculated distances Lsl, Lsr, departure risk calculation unit 300 generates a risk map having a risk distribution in which the departure risk exponentially increases toward the left end of the drivable width RW in the area defined by 0≤u≤a·Lsl and also exponentially increases toward the right end of the drivable width RW in the area defined by Lsl+(1−a)·Lsr<u≤RW.

The function of using the fourth adjustment gain Gks and the correction term Uns to calculate the distances Lsl, Lsr, and generating a risk map based on the calculated distances Lsl, Lsr corresponds to the function of risk map calculation unit 308 in FIG. 2.

Figure 10:
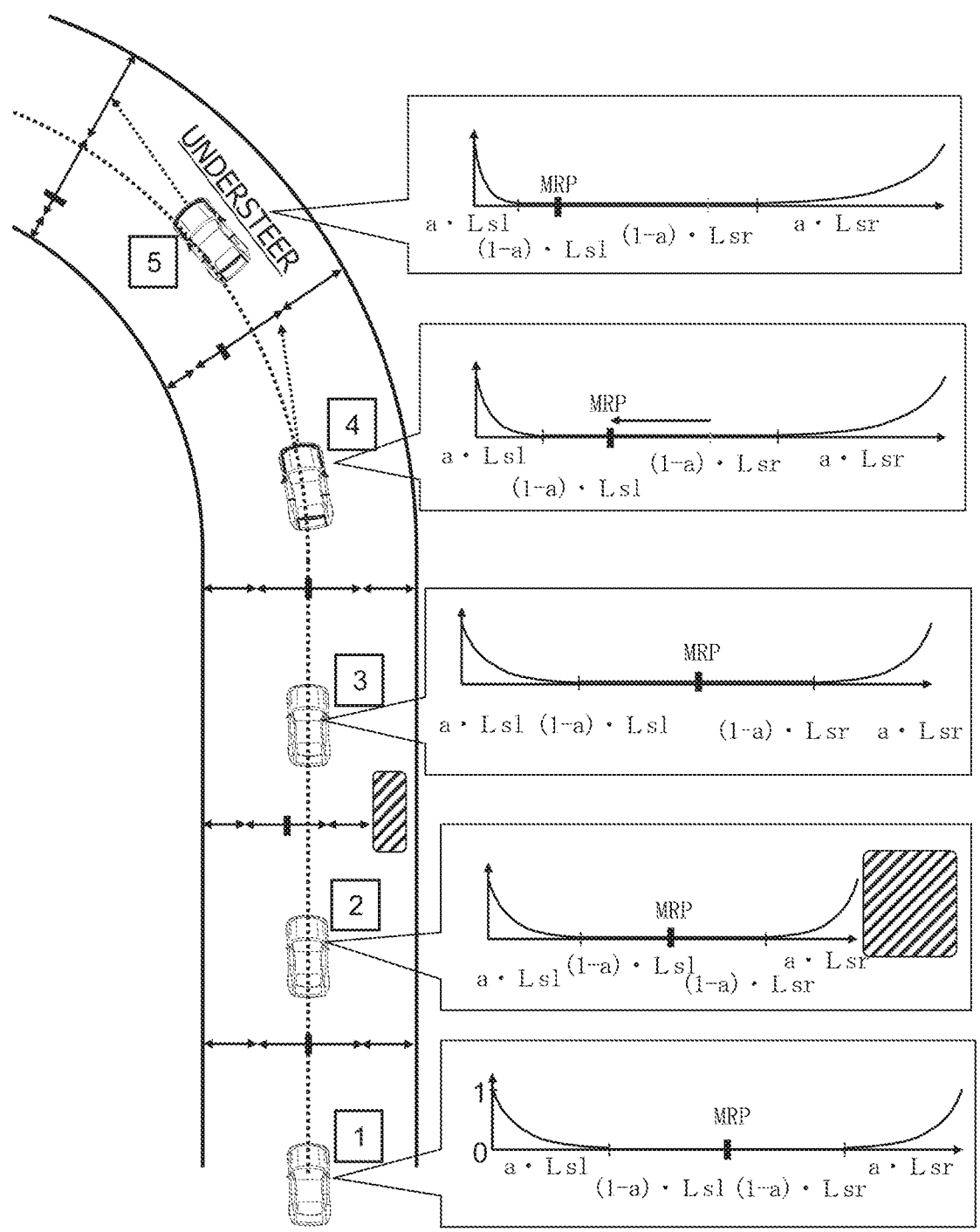
FIG. 10 is a diagram showing an example for illustrating how the risk map transitions in accordance with the driving conditions of the vehicle.

FIG. 10 shows an example for illustrating how the risk map transitions in accordance with the driving conditions of vehicle 1.

When vehicle 1 is traveling at a first point (indicated by "1" in a square box in FIG. 10, the same applies to second to fifth points below), vehicle 1 is on a straight road. Accordingly, the minimum risk point MRP is located at the center of the drivable width RW (equivalent to the lane width) of the road and a risk map having a symmetric risk distribution with respect to the minimum risk point MRP is generated and used.

When vehicle 1 is traveling at a second point, vehicle 1 is on the same straight road but an obstacle appears ahead of vehicle 1 on the right. In this case, the minimum risk point MRP is located at the center of the drivable width RW that does not include the lane width occupied by the obstacle, and a risk map having a symmetric risk distribution with respect to this minimum risk point MRP is generated and used.

When vehicle 1 is traveling at a third point, the obstacle partially occupying the lane width on the right of vehicle 1 has disappeared. Accordingly, the minimum risk point MRP is located again at the center of the original drivable width RW (equivalent to the lane width) and a risk map having a symmetric risk distribution with respect to the minimum risk point MRP is generated and used.

When vehicle 1 is traveling at a fourth point, a left-hand curve is approaching vehicle 1. Accordingly, the minimum risk point MRP is shifted toward the inside of the turn from the center of the drivable width RW in accordance with the curvature Ks of the left-hand curve, and a risk map modified such that the departure risk on the inside of the turn is less than on the outside of the turn is generated and used.

When vehicle 1 is traveling at a fifth point, vehicle 1 exhibits an understeer tendency. Accordingly, the minimum risk point MRP that has been shifted in accordance with the curvature Ks of the left-hand curve is further shifted toward the inside of the turn, and a risk map modified such that the departure risk on the inside of the turn is further reduced to be much less than on the outside of the turn is generated and used.

Next, a functional aspect of actuator operation variable calculation unit 400 to perform steering control based on the risk map generated as described above will be described.

Each of first departure risk calculation unit 404 and second departure risk calculation unit 405 in actuator operation variable calculation unit 400 calculates a distance hs from the preview point (Xs, Ys) to the left edge of the road, and calculates a course departure risk under the current driving conditions of vehicle 1 by assigning the distance hs to the input variable u of the risk map function.

Specifically, as the course departure risk, first departure risk calculation unit 404 calculates a left-edge road departure risk $COR_L$. The left-edge road departure risk $COR_L$ indicates a risk that vehicle 1 may depart from the road across the left road edge. Similarly, as the course departure risk, second departure risk calculation unit 405 calculates a right-edge road departure risk $COR_R$. The right-edge road departure risk $COR_R$ indicates a risk that vehicle 1 may depart from the road across the right road edge.

More specifically, when the distance hs satisfies 0≤hs≤a·Lsl, first departure risk calculation unit 404 and second departure risk calculation unit 405 calculate the left-edge road departure risk $COR_L$ and the right-edge road departure risk $COR_R$ using Expressions 7 below.

$$COR_L = \frac{e^{hs} - 1}{e^{a \cdot Lsl} - 1}$$ (Expressions 7)

$$COR_R = 0$$

When the distance hs satisfies Lsl+(1−a)·Lsr<hs≤RW, first departure risk calculation unit 404 and second departure risk calculation unit 405 calculate the left-edge road departure risk $COR_L$ and the right-edge road departure risk $COR_R$ using Expressions 8 below.

$$COR_L = 0$$ (Expressions 8)

$$COR_R = \frac{e^{(hs-(Lsl+(1-a)Lsr))} - 1}{e^{a \cdot Lsr} - 1}$$

When the distance hs satisfies a·Lsl<hs<Lsl or Lsl≤hs≤Lsl+(1−a)·Lsr, first departure risk calculation unit 404 and second departure risk calculation unit 405 set both the left-edge road departure risk $COR_L$ and the right-edge road departure risk $COR_R$ to zero.

Then, as the feedforward operation variable, F/F operation variable calculation unit 403 calculates a turning force $FY_{FF}$ required for vehicle 1 to travel stably on an approaching curve by applying the road curvature Ks at the preview point (Xs, Ys) and the vehicle speed Vc to Expression 9 below.

$$FY_{FF} = m \cdot Ks \cdot Vc^2$$ (Expression 9), where m is the mass of vehicle 1.

Then, FB operation variable calculation unit 402 calculates a target vehicle position (Xp, Yp) based on the external environment information, and calculates a feedback operation variable $FY_{FB}$ based on a displacement $G_{FB}$ from the target vehicle position (Xp, Yp) to the preview point (Xs, Ys), using, for example, a PID control as shown in Expression 10.

$$FY_{FB} = PID(G_{FB})$$ (Expression 10)

Then, target steering variable calculation unit 406 calculates the sum $FY_{vV}$ of the feedforward operation variable $FY_{FF}$ and the feedback operation variable $FY_{FB}$ as a lateral force required for vehicle 1 to travel stably on the approaching curve.

In addition, target steering variable calculation unit 406 calculates a yaw moment ML expected to be generated when the lateral force $FY_V$ is applied to vehicle 1, using the transfer function shown in Expression 11.

As used herein, m is the vehicle mass, Vc is the vehicle speed, $K_f$ is the front wheel cornering power, $K_r$ is the rear wheel cornering power, $l_f$ is the distance between the center of gravity and the front axle, $l_r$ is the distance between the center of gravity and the rear axle, l is the wheelbase, $I_z$ is the vehicle inertia, A is the stability factor, and S is the Laplace operator.

$$\frac{ML}{FY_V} = G_r(0) \cdot \frac{s(1 + T_r s)}{(G_\beta(0) \cdot T_\beta(0))S^2 + (T_r \cdot G_r(0) + G_\beta(0))S + G_r(0)} \cdot \frac{1}{m \cdot Vc} \cdot I_z,$$ (Expression 11)

where $G_r(0)$, $G_\beta(0)$, $T_r$, $T_\beta$ are as defined by Expressions 12 below.

$$G_r(0) = \left(\frac{1}{1 + A \cdot Vc^2}\right) \cdot \frac{Vc}{l}$$ (Expressions 12)

$$G_\beta(0) = \left(\frac{1 - \frac{m \cdot l_f}{2 \cdot l \cdot l_r \cdot K_r} \cdot Vc^2}{1 + A \cdot Vc^2}\right) \cdot \frac{l_r}{l}$$

$$T_r = \frac{m \cdot l_f \cdot Vc}{2 \cdot l \cdot K_r}$$

$$T_\beta = \frac{I_z \cdot Vc}{2 \cdot l \cdot l_r \cdot K_r \cdot \left(1 - \frac{m \cdot l_f}{2 \cdot l \cdot l_r \cdot K_r} \cdot Vc^2\right)}$$

Assume that a yaw moment Mst for stabilizing the behavior of vehicle 1 (referred to as "vehicle behavior stabilizing yaw moment Mst" below) is given by yaw moment calculation unit 221, the motion of vehicle 1 travelling on the course ahead in a favorable manner with stable behavior may be described by Expressions 13 below.

$$FY_V = FY_f + FY_r$$

$$ML + Mst = l_f \cdot FY_f - l_r \cdot FY_r$$ (Expressions 13), where $FY_f$ is the total lateral force of the two front wheels, and FY, is the total lateral force of the two rear wheels.

Simplifying Expressions 13 above gives Expressions 14 below.

$$FY_f = \frac{ML + Mst}{l} + \frac{l_r}{l} FY_V$$ (Expressions 14)

$$FY_r = -\frac{ML + Mst}{l} + \frac{l_f}{l} FY_V$$

Thus, target steering variable calculation unit 406 calculates a steering angle δ by applying the front wheel lateral force $FY_f$ calculated using the former of Expressions 14 to Expression 15 below.

$$\delta = \beta + \frac{l_f}{Vc} \gamma - \frac{FY_f}{2 \cdot K_f},$$ (Expression 15)

where β is the sideslip angle, and γ is the yaw rate.

Note that the procedure for calculating the steering angle δ described above is merely a general procedure. Hereinafter, calculation of the steering angle δ by taking into account a lane departure risk of vehicle 1 will be described.

Assume a case in which vehicle 1 travels on a right-hand curve and there is a high risk of departure to the right, which corresponds to the inside of the turn, as an example. When vehicle 1 travels on a right-hand curve, the feedforward operation variable $FY_{FF}$ requests a force that moves vehicle 1 to the right. However, based on the high risk of departure to the right, the feedback operation variable $FY_{FB}$ requests a force that moves vehicle 1 to the left.

Here, when there is a risk of departure to the right, the rightward movement distance requested by the feedforward operation variable $FY_{FF}$ may have an adverse effect, causing lane departure of vehicle 1, depending on the balance between the feedforward operation variable $FY_{FF}$ and the feedback operation variable $FY_{FB}$.

Accordingly, target steering variable calculation unit 406 corrects the feedforward operation variable $FY_{FF}$ and the feedback operation variable $FY_{FB}$ in accordance with the departure risks $COR_L$, $COR_R$ as described below.

First, target steering variable calculation unit 406 determines whether vehicle 1 is turning left or right based on whether the road curvature Ks is negative or positive, and corrects the feedforward operation variable $FY_{FF}$ based on the departure risk $COR_L$, $COR_R$ as follows.

When Ks<0 (when vehicle 1 turns left):

$$FY^*_{FF} = m \cdot Xs \cdot Vc^2 \cdot (1 - COR_L)$$

When Ks>0 (when vehicle 1 turns right):

$$FY^*_{FF} = m \cdot Xs \cdot Vc^2 \cdot (1 - COR_R)$$

That is, when, for example, vehicle 1 travels on a right-hand curve, target steering variable calculation unit 406 downwardly corrects the F/F operation variable $FY_{FF}$ by a greater amount so as to further reduce the lateral force that moves vehicle 1 to the right (i.e., toward the inside of the turn), as the risk of departure to the right (i.e., toward the inside of the turn) is higher. This reduces or prevents vehicle 1 from turning more inward than intended and departing from the curve.

Furthermore, target steering variable calculation unit 406 determines whether vehicle 1 is traveling on the right side or the left side of the target vehicle position based on whether the displacement $G_{FB}$ from the target vehicle position (Xp, Yp) to the preview point (Xs, Ys) is negative or positive, and corrects the feedback operation variable $FY_{FB}$ based on the departure risk $COR_L$, $COR_R$ as follows.

When $G_{FB}$<0 (when vehicle 1 is traveling on the right side of the target vehicle position):

$$FY^*_{FB} = PID(G_{FB}) \cdot (1 - COR_L)$$

When $G_{FB}$>0 (when vehicle 1 is traveling on the left side of the target vehicle position):

$$FY^*_{FB} = PID(G_{FB}) \cdot (1 - COR_R)$$

That is, when, for example, vehicle 1 is traveling on the right side of the target vehicle position, and thus, the feedback operation variable $FY_{FB}$ requests a force that moves vehicle 1 to the left, target steering variable calculation unit 406 reduces such a lateral force that moves vehicle 1 to the target vehicle position by a greater amount as the left-edge road departure risk $COR_L$ is higher. This reduces or prevents vehicle 1 from departing from the lane due to the lateral force generated based on the feedback operation variable $FY_{FB}$.

Furthermore, in accordance with the departure risks $COR_L$, $COR_R$, target steering variable calculation unit 406 corrects the vehicle behavior stabilizing yaw moment Mst that has calculated by yaw moment calculation unit 221, and uses the corrected yaw moment Mst to calculate the steering angle δ.

Assume a case in which there is a high risk of lane departure to the right but vehicle 1 has a tendency to spin counterclockwise, and thus, a yaw moment that helps vehicle 1 turn right is requested in order to stabilize vehicle 1.

In this case, calculating the steering angle δ in the above manner may result in steering vehicle 1 to turn right, i.e., may result in counter-steering, and thus, may help vehicle 1 depart from the lane.

Thus, target steering variable calculation unit 406 corrects the vehicle behavior stabilizing yaw moment Mst according to the departure risks $COR_L$, $COR_R$ as described below.

When Mst<0 (which helps vehicle 1 turn left):

$$M^*st = Mst \cdot (1 - COR_L)$$

When Mst>0 (which helps vehicle 1 turn right):

$$M^*st = Mst \cdot (1 - COR_R)$$

That is, when, for example, there is a high risk of right-edge road departure, but the vehicle behavior stabilizing yaw moment Mst that helps vehicle 1 turn right is requested, target steering variable calculation unit 406 corrects the vehicle behavior stabilizing yaw moment Mst downward so that vehicle 1 is less helped to turn right, thereby preventing vehicle 1 from departing from the road across the right road edge.

Then, target steering variable calculation unit 406 calculates the steering angle δ based on the corrected vehicle behavior stabilizing yaw moment M*st.

As described above, target steering variable calculation unit 406 calculates the steering angle δ using the feedforward operation variable $FY^*_{FF}$, the feedback operation variable $FY^*_{FB}$, and the vehicle behavior stabilizing yaw moment M*st that are corrected in accordance with the departure risks $COR_L$, $COR_R$.

With this configuration, when there is a high departure risk, priority is given to a steering operation to separate vehicle 1 from the road edge on the higher departure risk side over other steering operations. Furthermore, when vehicle 1 is then separated satisfactorily from the road edge, vehicle 1 seamlessly transitions to a state in which the requested vehicle behavior stabilizing value is appropriately processed as usual.

Assume a case in which, after vehicle 1 travels on a straight road having a first drivable width, vehicle 1 enters a curved road having a second drivable width at a predetermined speed or more, and the first drivable width is equal to the second drivable width, as an example. In this case, the risk distribution of the risk map is modified from a risk distribution symmetric in the road width direction, which is adapted to the straight road (corresponding to the risk map at third point in FIG. 10, for example) to a risk distribution in which the minimum risk point MRP is shifted toward the inside of the turn by taking into account the departure risk on the outside of the turn (corresponding to the risk map at fourth or fifth point in FIG. 10, for example). Based on the modified risk map, vehicle 1 is steered so as to separate from the road edge on the outside, with a higher departure risk, of the turn.

That is, even if a straight road and a curved road that follows the straight road have the same drivable width, the minimum risk point MRP is located at the different positions between the risk map generated for the straight road and the risk map generated for the curved road. As a result, the position of vehicle 1 in the road width direction when vehicle 1 travels on the straight road and the position of vehicle 1 in the road width direction when vehicle 1 travels on the curved road are both within the drivable width RW but differ from each other.

Therefore, according to this embodiment, it is possible to more reliably ensure safety of vehicle 1 by taking into account the risk that the controllability of vehicle 1 may decrease in a curved road.

The technical concepts described in the above embodiment may be used in combination with each other as necessary, as long as no conflict arises.

Although the present invention has been described in detail with reference to the preferred embodiment, it is apparent that the above embodiment may be modified in various forms by one skilled in the art based on the fundamental technical concepts and teachings of the present invention.

In the driver assistance device, method, and system according to the above embodiment, the risk map is modified based on the road curvature, vehicle speed, friction coefficient of a road surface, and oversteer/understeer tendency. However, the present invention is not limited to this. For example, the risk map may be modified based on the road curvature alone. Still alternatively, the risk map may be modified based on the road curvature and at least one of the vehicle speed, the friction coefficient of a road surface, and the steering characteristic (oversteer/understeer tendency).

In the above embodiment, the risk map is modified by varying the distances Lsl, Lsr, i.e., by shifting the minimum risk point MRP. However, it is apparent that the method for generating or modifying the risk map is not limited to that described in the above embodiment, but may be implemented in various modified forms.

Alternatively or additionally, the driver assistance device, method, and system according to the present invention may be configured to modify the risk map in accordance with an angle of transverse inclination of the road or the like. For example, assume a case in which a vehicle travels on a curve transversely inclined such that the road level on the inside of the turn is lower than the road level on the outside of the turn, and a case in which the vehicle travels on a curve having the same road curvature as this transversely inclined curve but no transverse inclination. In the former case, even if the risk on the outside of the turn may be corrected downward by a greater amount than in the latter case, the safety of the vehicle may be ensured.

REFERENCE SYMBOL LIST

1 Vehicle
12 Steering device
13 External environment recognition control unit (external environment recognition unit) Driver assistance control unit (driver assistance device)
200 Driver assistance system
212 Vehicle speed acquisition unit
213 Road surface friction coefficient acquisition unit
214 Oversteer determination unit
215 Understeer determination unit
300 Departure risk calculation unit
400 Actuator operation variable calculation unit
500 Actuator operation output unit

The invention claimed is:

1. An apparatus comprising:
a driver assistance device, configured to:
modify determine risk distribution-related information regarding a departure risk distribution such that a risk on an inside of a turn is greater than on an outside of a turn, or such that a risk on an outside of a turn is greater than on an inside of a turn based on driving environment-related information regarding a driving environment of a curve approaching a vehicle, the departure risk distribution being a distribution of a risk of the vehicle departing from a drivable width of a road on which the vehicle travels that is set such that the departure risk increases gradually with a decrease in a distance to a road edge, the driving environment-related information being acquired by an external environment recognition unit;
calculate a risk of the vehicle departing from the drivable width at a preview point by referring to determine actuator operation variable-related information regarding an operation variable of an actuator related to a steering operation of the vehicle, based on the risk distribution-related information; and modify an actuator operation variable-related information regarding an operation variable of an actuator related to a steering operation of the vehicle for the vehicle to travel on the curve, based on a magnitude of the risk of the vehicle departing from the drivable width at a preview point to output the actuator operation variable-related information to the actuator.

2. The apparatus according to claim 1,
which is configured to modify wherein the driver assistance device modifies the departure risk distribution such that a departure risk on an outside of a turn is greater than a departure risk on an inside of the turn in the drivable width as a road curvature of the curve is greater, the road curvature of the curve at least partially constituting the driving environment-related information on the curve.

3. The apparatus according to claim 1,
which is configured to modify wherein the driver assistance device modifies the departure risk distribution so as to increase a departure risk on an outside of a turn in the drivable width, when understeer-related information indicates an understeer tendency, the understeer-related information at least partially constituting behavioral state-related information on the vehicle acquired by a vehicle behavior sensing unit.

4. The apparatus according to claim 1,
which is configured to modify wherein the driver assistance device modifies the departure risk distribution such that a departure risk on an outside of a turn in the drivable width is greater as a speed of the vehicle is greater, the speed of the vehicle at least partially constituting behavioral state-related information on the vehicle acquired by a vehicle behavior sensing unit.

5. The apparatus according to claim 1,
which is configured to modify wherein the driver assistance device modifies the departure risk distribution such that a departure risk on an outside of a turn in the drivable width is greater as a friction coefficient of a road surface with which wheels of the vehicle are in contact is greater, the friction coefficient of the road surface at least partially constituting the driving environment-related information on the curve.

6. The apparatus according to claim 1,
wherein the driver assistance device modifies the departure risk distribution so as to increase a departure risk on an inside of a turn in the drivable width, when oversteer-related information indicates an oversteer tendency, the oversteer-related information at least partially constituting behavioral state-related information on the vehicle acquired by a vehicle behavior sensing unit.

7. The apparatus according to claim 1, wherein;
the departure risk distribution is symmetric with respect to a minimum risk point so that the departure risk increases toward right and left ends of the drivable width, and
wherein the driver assistance device is configured to shift the minimum risk point in accordance with the driving environment of the curve.

8. A driver assistance method, comprising:
modify determining risk distribution-related information regarding a departure risk distribution such that a risk on an inside of a turn is greater than on an outside of a turn, or such that a risk on an outside of a turn is greater than on an inside of a turn based on driving environment-related information regarding a driving environment of a curve approaching a vehicle, the departure risk distribution being a distribution of a risk of the vehicle departing from a drivable width of a road on which the vehicle travels that is set such that the departure risk increases gradually with a decrease in a distance to a road edge, the driving environment-related information being acquired by an external environment recognition unit;

calculating a risk of the vehicle departing from the drivable width at a preview point by referring to determining actuator operation variable-related information regarding an operation variable of an actuator related to a steering operation of the vehicle, based on the risk distribution-related information; and modifying an actuator operation variable-related information regarding an operation variable of an actuator related to a steering operation of the vehicle for the vehicle to travel on the curve, based on a magnitude of the risk of the vehicle departing from the drivable width to output outputting the actuator operation variable-related information to the actuator.

9. A driver assistance system comprising:

an external environment recognition unit configured to acquire driving environment-related information regarding a driving environment of a curve approaching a vehicle;

a departure risk calculation unit configured to modify determine risk distribution-related information regarding a departure risk distribution such that a risk on an inside of a turn is greater than on an outside of a turn, or such that a risk on an outside of a turn is greater than on an inside of a turn based on the driving environment-related information on the curve acquired by the external environment recognition unit, the departure risk distribution being a distribution of a risk of the vehicle departing from a drivable width of a road on which the vehicle travels that is set such that the departure risk increases gradually with a decrease in a distance to a road edge, an actuator operation variable calculation unit configured to calculate a risk of the vehicle departing from the drivable width at a preview point by referring to determine actuator operation variable-related information regarding an operation variable of an actuator related to a steering operation of the vehicle, based on the risk distribution-related information determined by the departure risk calculation unit, and to modify an actuator operation variable-related information regarding an operation variable of an actuator related to a steering operation of the vehicle for the vehicle to travel on the curve, based on a magnitude of the risk of the vehicle departing from the drivable width at a preview point; and an actuator operation output unit configured to output, to the actuator, the actuator operation variable-related information determined by the actuator operation variable calculation unit.

10. The driver assistance device according to claim 1, which is configured to calculate a turning force required for the vehicle to travel stably on an approaching curve by applying a road curvature at the preview point and the vehicle speed;

downwardly correct the turning force by a greater amount, as the risk of departure from a road edge of an inside of the turn is higher; and calculate an operation variable of the actuator based on the corrected turning force.

11. The driver assistance device according to claim 1, which is configured to calculate a lateral force that moves the vehicle to a target vehicle position based on a distance between the target vehicle position and the preview point, downwardly correct the lateral force by a greater amount, as the departure risk from a road edge of a direction to which the lateral force moves the vehicle is higher; and calculate an operation variable of the actuator based on the corrected turning force.

12. The driver assistance device according to claim 1, which is configured to:

calculate a yaw moment required to prevent sideslip of the vehicle;

downwardly correct the yaw moment by a greater amount as the departure risk from a road edge of a direction to which the vehicle turns by the yaw moment is higher; and calculate an operation variable of the actuator based on the corrected yaw moment.

* * * * *